(12) United States Patent
Jain et al.

(10) Patent No.: US 11,388,105 B2
(45) Date of Patent: Jul. 12, 2022

(54) CONTENT SOURCE ALLOCATION BETWEEN COMPUTING DEVICES

(71) Applicant: Google LLC, Mountain View, CA (US)

(72) Inventors: Tarun Kumar Jain, Los Altos, CA (US); Anshul Kothari, Cupertino, CA (US); Gaurav Bhaya, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1029 days.

(21) Appl. No.: 16/062,944

(22) PCT Filed: Dec. 8, 2017

(86) PCT No.: PCT/US2017/065458
§ 371 (c)(1),
(2) Date: Jun. 15, 2018

(87) PCT Pub. No.: WO2019/112623
PCT Pub. Date: Jun. 13, 2019

(65) Prior Publication Data
US 2021/0083988 A1 Mar. 18, 2021

(51) Int. Cl.
*H04L 12/911* (2013.01)
*H04L 47/78* (2022.01)
(Continued)

(52) U.S. Cl.
CPC ............ *H04L 47/781* (2013.01); *G06F 3/167* (2013.01); *G10L 15/22* (2013.01); *H04L 47/76* (2013.01);
(Continued)

(58) Field of Classification Search
CPC ..... H04L 47/781; H04L 47/76; H04L 47/803; H04L 67/42; G06F 3/167; G06F 9/5044;
(Continued)

(56) References Cited

U.S. PATENT DOCUMENTS

2007/0192300 A1   8/2007  Reuther et al.
2009/0254572 A1*  10/2009 Redlich ................. G06Q 10/06
(Continued)

FOREIGN PATENT DOCUMENTS

WO    WO-2011/088053    7/2011

OTHER PUBLICATIONS

Examination Report for EP Appln. Ser. No. 17826344.8 dated Apr. 16, 2021 (8 pages).
(Continued)

*Primary Examiner* — Michael Won
(74) *Attorney, Agent, or Firm* — Dority & Manning, P.A.

(57) ABSTRACT

Systems and methods of the present disclosure relate generally to allocation of content resources in a voice activated packet-based computer network. A request for a digital component, by a client computing device, can be fulfilled by multiple content sources. Fulfillment by the different content sources can consume different amounts of computational and network resources. The selection of the best content provider can improve the efficiency and effectiveness of data packet transmission over one or more computer networks.

20 Claims, 4 Drawing Sheets

(51) Int. Cl.
G06F 3/16 (2006.01)
G10L 15/22 (2006.01)
H04L 47/76 (2022.01)
H04L 47/80 (2022.01)
H04L 67/01 (2022.01)

(52) U.S. Cl.
CPC ............ H04L 47/803 (2013.01); H04L 67/42 (2013.01); *G10L 2015/223* (2013.01)

(58) Field of Classification Search
CPC .............. G10L 15/22; G10L 2015/223; G06Q 30/0251
See application file for complete search history.

(56) References Cited

U.S. PATENT DOCUMENTS

| | | | |
|---|---|---|---|
| 2009/0276419 A1* | 11/2009 | Jones | G06F 16/3322 |
| 2014/0119363 A1* | 5/2014 | Solihin | H04L 49/253 |
| | | | 370/352 |
| 2014/0222436 A1 | 8/2014 | Binder et al. | |
| 2014/0337131 A1 | 11/2014 | Edara | |
| 2015/0278348 A1 | 10/2015 | Paruchuri et al. | |
| 2015/0332355 A1* | 11/2015 | Kost | G06Q 30/0283 |
| | | | 705/35 |
| 2017/0078346 A1 | 3/2017 | Chao | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0237801 A1* | 8/2017 | Baluja | H04L 67/04 |
| | | | 709/217 |
| 2017/0358301 A1 | 12/2017 | Raitio et al. | |
| 2018/0061409 A1* | 3/2018 | Valentine | G10L 15/24 |
| 2018/0196683 A1* | 7/2018 | Radebaugh | G06F 3/167 |
| 2018/0205635 A1* | 7/2018 | Kim | G06F 16/148 |
| 2018/0329677 A1* | 11/2018 | Gruber | G06F 3/0488 |
| 2018/0331928 A1* | 11/2018 | Dave | G06F 9/5072 |
| 2019/0220756 A1* | 7/2019 | Williams | G06F 16/353 |
| 2019/0295542 A1* | 9/2019 | Huang | G10L 15/30 |

OTHER PUBLICATIONS

International Preliminary Report on Patentability, Ch. I, for PCT Appln. Ser. No. PCT/US2017/065458 dated Jun. 18, 2020 (8 pages).
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Ser. No. PCT/US2017/065458 dated Aug. 1, 2018 (13 pages).
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.

(56) References Cited

OTHER PUBLICATIONS com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load up Apps' Legal Challenges at 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).

\* cited by examiner

CONTENT SOURCE ALLOCATION BETWEEN COMPUTING DEVICES

RELATED APPLICATIONS

This application is a U.S. National Stage under 35 U.S.C. § 371 of International Patent Application No. PCT/US2017/065458, filed on Dec. 8, 2017 and designating the United States, and is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to digital component objects can be complicated by a large number of digital component objects that can initiate network transmissions of network traffic data between computing devices.

SUMMARY

At least one aspect of the disclosure is directed to a system configured to allocate content sources in a voice activated packet-based computer network environment. The system can include a data processing system that includes one or more processors. A natural language processor component, executed by a data processing system, can receive, at an interface of a data processing system, data packets that can include an input audio signal. The input audio signal can be detected by a sensor of a client computing device and transmitted from the client device to the data processing system. The natural language processor component can parse the input audio signal to identify a request and a trigger keyword corresponding to the request. A direct action application programming interface can generate, based on at least one of the request and the trigger keyword, a first action data structure. A content selector component, executed by the data processing system, can select a digital component based on at least one of the request and the trigger keyword. A source allocation component can identify a plurality of candidate content sources after selecting the digital component. Each of the plurality of content sources may include a respective instance of the digital component. The source allocation component can determine a characteristic for each of the plurality of candidate content sources and for the instances of the digital component. The source allocation component can select a content source from the plurality of candidate content sources based on the characteristics for each of the plurality of candidate content sources and the instances of the digital components. The client computing device can request an instance of the content item from the content source.

At least one aspect of the disclosure is directed to a method to allocate content sources in a voice activated packet-based computer network environment. The method may include receiving, by a natural language processor component executed by a data processing system, data packets that can include an input audio signal. The input audio signal can be detected by a sensor of a client device and transmitted to the data processing system by the client device. The method may include parsing, by the natural language processor component, the input audio signal to identify a request and a trigger keyword corresponding to the request. The method may include generating, by a direct action application programming interface and based on at least one of the request and the trigger keyword, a first action data structure. The method may include selecting, by a content selector component, a digital component based on at least one of the request and the trigger keyword. The method may include identifying, by a source allocation component, a plurality of candidate content sources after identifying the digital component. Each of the plurality of content sources may include a respective instance of the digital component. The method may include determining, by the source allocation component, a characteristic for each of the plurality of candidate content sources and the instances of the digital component. The method may include selecting, by the source allocation component, a content source from the plurality of candidate content sources based on the characteristics for each of the plurality of candidate content sources and the instances of the digital components. The method may include requesting, by the source allocation component, an instance of the digital component from the content source.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
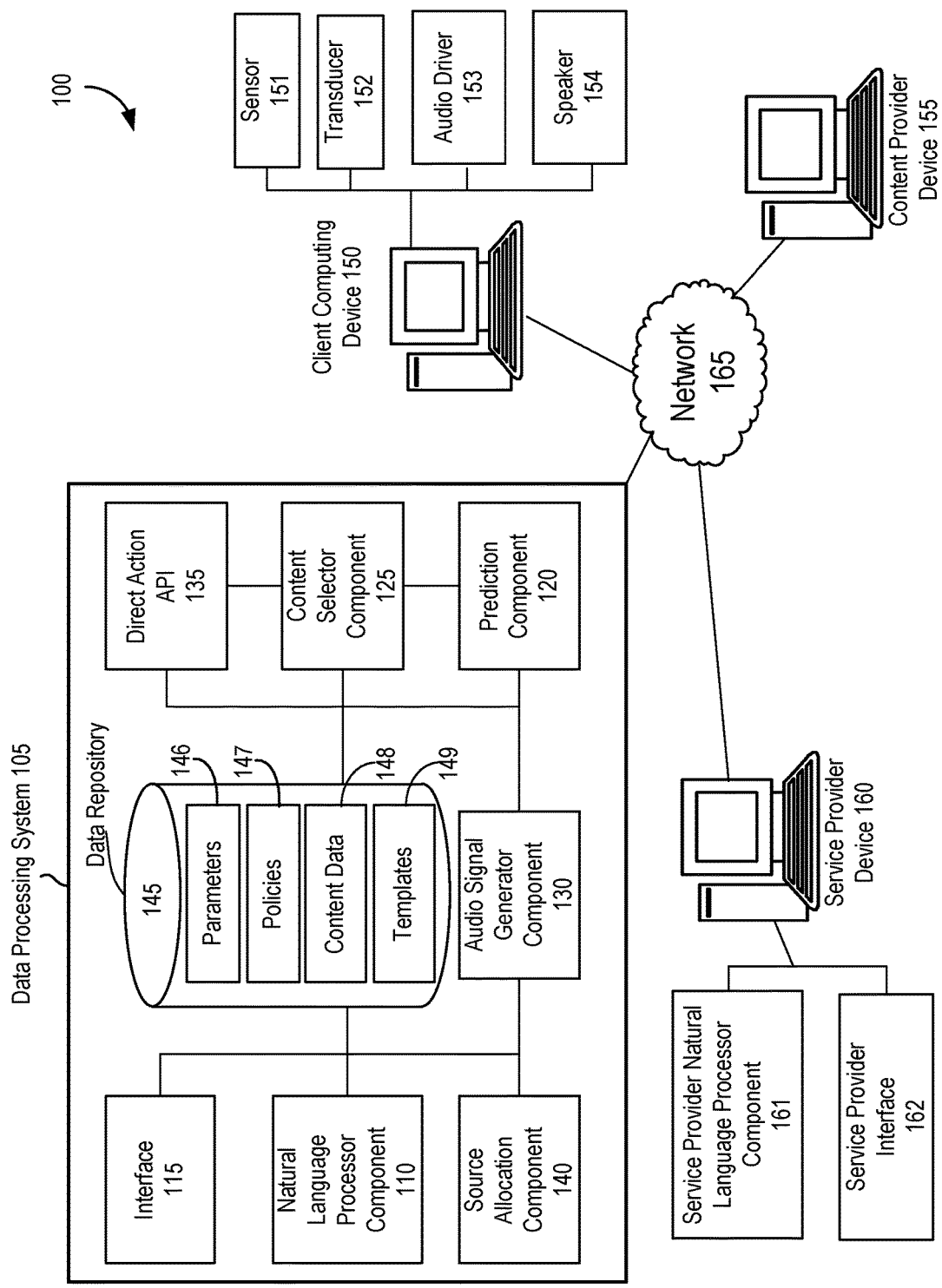
FIG. 1 depicts a system to of multi-modal transmission of packetized data in a voice activated computer network environment.

Following below are more detailed descriptions of various concepts related to, and implementations of, methods, apparatuses, and systems for multi-modal transmission of packetized data in a voice activated data packet-based computer network environment. The various concepts introduced above and discussed in greater detail below may be implemented in any of numerous ways.

Systems and methods of the present disclosure relate generally to allocation of content resources in a voice activated packet (or other protocol) based computer network. A request for a digital component, by a client computing device, can be fulfilled by multiple content sources. For example, each of the content sources can include an instance of the digital component and be configured to provide the instance of the digital component to the requesting client computing device. Fulfillment by the different content sources can consume different amounts of computational and network resources. For example, some instances of the digital component may be of higher quality (and have a larger file size) or may be located at geographically remote locations. The selection of the content provider can therefore improve the efficiency and effectiveness of data packet transmission over one or more computer networks by, for example, selecting content providers that can provide the digital component to the client computing device while using fewer computational and network resources. The system can rank possible candidate content sources based on technical or computing parameters such as processor capability or utilization rate, memory capability or availability, battery status, available power, network bandwidth utilization, interface parameters, file characteristics, bandwidth availability, or any combination thereof. By selecting an appropriate candidate content source to provide the digital component for rendering from the client computing device, the data processing system can reduce network bandwidth usage, latency, or processing utilization or power consumption of the client computing device that renders the digital component. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query, which can also be referred to herein as an input audio signal. From the input audio query, the data processing system can identify a request and a trigger keyword corresponding to the request. Based on the trigger keyword or the request, the data processing system can generate a first action data structure. For example, the first action data structure can include an organic response to the input audio query received from a client computing device, and the data processing system can provide the first action data structure to the same client computing device for rendering as audio output via the same interface from which the request was received.

The data processing system can also select at least one digital component based on the trigger keyword or the request. The digital components can be content items, such as digital documents, videos, songs, webpages, portions of webpages, or other electronic files. The digital components can be the data associated with a user or a user account. For example, a digital component can be the emails or other data associated with a user's email account. The data processing system can identify or determine a plurality of candidate content sources that can provide the digital component to the client computing device. The data processing system can calculate one or more characteristics for each of the candidate content sources.

The data processing system can provide the digital component or the first action data structure by packet or other protocol based data message transmission via a computer network to a client computing device. The data processing system can initiate a session between the selected candidate content source and the client computing device such that the candidate content source provides the client computing device the digital component rather than relaying the digital component to the client computing device through the data processing system.

The digital component can cause an audio driver component of the client computing device to generate an acoustic wave, e.g., an audio output, which can be output from the client computing device. The audio (or other) output can correspond to the first action data structure or to the digital component. For example the first action data structure can be routed as audio output, and the digital component can be routed as a text based message. By routing the first action data structure and the digital component to different interfaces, the data processing system can conserve resources utilized by each interface, relative to providing both the first action data structure and the digital component to the same interface. This results in fewer data processing operations, less memory usage, or less network bandwidth utilization by the selected interfaces (or their corresponding devices) than would be the case without separation and independent routing of the first action data structure and the digital component.

FIG. 1 depicts an example system 100 for multi-modal transmission of packetized data in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from an input audio signal a request and a trigger keyword associated with the request. Based on the request and trigger keyword the data processing system 105 can determine or select at least one action data structure, and can select at least one digital component (and initiate other actions as described herein). The data processing system 105 can identify candidate interfaces for rendering of the action data structures or the digital components, and can provide the action data structures or the digital components for rendering by one or more candidate interfaces on one or more client computing devices based on resource utilization values for or of the candidate interfaces, for example as part of a voice activated communication or planning system. The action data structures (or the digital components) can include one or more audio files that when rendered provide an audio output or acoustic wave. The action data structures or the digital components can include other content (e.g., text, video, or image content) in addition to audio content.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one prediction component 120, at least one content selector component 125, at least one audio signal generator component 130, at least one direct action application programming interface (API) 135, at least one source allocation component 140, and at least one data repository 145. The NLP component 110, interface 115, prediction component 120, content selector component 125, audio signal generator component 130, direct action API 135, and source allocation component 140 can each include at least one processing unit, server, virtual server, circuit, engine, agent, appliance, or other logic device such as programmable logic arrays configured to communicate with the data repository 145 and with other computing devices (e.g., at least one client computing device 150, at least one content provider computing device 155, or at least one service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a content placement or search engine results system, or that are eligible to include third party digital components as part of a digital component placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the data processing system 105, the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal, or vice-versa. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The audio output can correspond to an action data structure received from the direct action API 135, or a digital component selected by the content selector component 125. The computer generated voice can include recordings from a real person or computer generated language.

The content provider computing device 155 (or the data processing system 105 or service provider computing device 160) can provide audio based digital components or action data structures for display by the client computing device 150 as an audio output. The action data structure of a digital component can include an organic response or offer for a good or service, such as a voice based message that states: "Today it will be sunny and 80 degrees at the beach" as an organic response to a voice-input query of "Is today a beach day?". The data processing system 105 (or other system 100 component such as the content provider computing device 155) can also provide a digital component as a response, such as a voice or text message based digital component offering sunscreen.

The content provider computing device 155 or the data repository 145 can include memory to store a series of audio action data structures or digital components that can be provided in response to a voice based query. The action data structures and digital components can include packet based data structures for transmission via the network 165. The content provider computing device 155 can also provide audio or text based digital components (or other digital components) to the data processing system 105 where they can be stored in the data repository 145. The data processing system 105 can select the audio action data structures or text based digital components and provide (or instruct the content provider computing device 155 to provide) them to the same or different client computing devices 150 responsive to a query received from one of those client computing device 150. The audio based action data structures can be exclusively audio or can be combined with text, image, or video data. The digital components can be exclusively text or can be combined with audio, image or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages (e.g., action data structures or digital components) to the direct action API 135 of the data processing system 105. The direct action API 135 can also generate the action data structures independent from or without input from the service provider computing device 160. The service provider computing device 160 and the content provider computing device 155 can be associated with the same entity. For example, the content provider computing device 155 can create, store, or make available digital components for beach related services, such as sunscreen, beach towels or bathing suits, and the service provider computing device 160 can establish a session with the client computing device 150 to respond to a voice input query about the weather at the beach, directions for a beach, or a recommendation for an area beach, and can provide these digital components to the end user of the client computing device 150 via an interface of the same client computing device 150 from which the query was received, a different interface of the same client computing device 150, or an interface of a different client computing device. The data processing system 105, via the direct action API 135, the NLP component 110 or other components can also establish the session with the client computing device, including or bypassing the service provider computing device 160, for example to provide an organic response to a query related to the beach.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include digital components for audio output or associated metadata, as well as input audio messages that can be part of one or more communication sessions with the client computing device 150.

The system 100 can optimize processing of action data structures and digital components in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of action data structures as audio output for display from the client computing device 150 to accomplish tasks related to an input audio signal. For example, the data processing system can communicate with the service provider computing device 160 or other third party computing devices to generate action data structures with information about a beach, among other things. For example, an end user can enter an input audio signal into the client computing device 150 of: "OK, I would like to go to the beach this weekend" and an action data structure can indicate the weekend weather forecast for area beaches, such as "it will be sunny and 80 degrees at the beach on Saturday, with high tide at 3 pm."

The action data structures can include a number of organic or non-sponsored responses to the input audio signal. For example, the action data structures can include a beach weather forecast or directions to a beach. The action data structures in this example include organic, or non-sponsored content that is directly responsive to the input audio signal. The digital components responsive to the input audio signal can include sponsored or non-organic content, such as an offer to buy sunscreen from a convenience store located near the beach. In this example, the organic action data structure (beach forecast) is responsive to the input audio signal (a query related to the beach), and the digital component (a reminder or offer for sunscreen) is also responsive to the same input audio signal. The data processing system 105 can evaluate system 100 parameters (e.g., power usage, available displays, formats of displays, memory requirements, bandwidth usage, power capacity or time of input power (e.g., internal battery or external power source such as a power source from a wall output)) to provide the action data structure and the digital component to different candidate interfaces on the same client computing device 150, or to different candidate interfaces on different client computing devices 150.

The data processing system 105 can include an application, script or program installed at the client computing device 150, such as an app to communicate input audio signals (e.g., as data packets via a packetized or other protocol based transmission) to at least one interface 115 of the data processing system 105 and to drive components of the client computing device 150 to render output audio signals (e.g., for action data structures) or other output signals (e.g., digital components). The data processing system 105 can receive data packets or other signal that includes or identifies an input audio signal. For example, the data processing system 105 can execute or run the NLP component 110 to receive the input audio signal.

The NLP component 110 can convert the input audio signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The input audio signal can be detected by the sensor 151 (e.g., a microphone) of the client computing device. Via the transducer 152, the audio driver 153, or other components the client computing device 150 can provide the input audio signal to the data processing system 105 (e.g., via the network 165) where it can be received (e.g., by the interface 115) and provided to the NLP component 110 or stored in the data repository 145 as content data 148.

The NLP component 110 can receive or otherwise obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The prediction component 120 (or other mechanism of the data processing system 105) can generate, based on the request or the trigger keyword, at least one action data structure associated with the input audio signal. The action data structure can indicate information related to subject matter of the input audio signal. The action data structure can include one or more than one action, such as organic responses to the input audio signal. For example, the input audio signal "OK, I would like to go to the beach this weekend" can include at least one request indicating an interest for a beach weather forecast, surf report, or water temperature information, and at least one trigger keyword, e.g., "go" indicating travel to the beach, such as a need for items one may want to bring to the beach, or a need for transportation to the beach. The prediction component 120 can generate or identify subject matter for at least one action data structure, an indication of a request for a beach weather forecast, as well as subject matter for a digital component, such as an indication of a query for sponsored content related to spending a day at a beach. From the request or the trigger keyword the prediction component 120 (or other system 100 component such as the NLP component 110 or the direct action API 135) predicts, estimates, or otherwise determines subject matter for action data structures or for digital components. From this subject matter, the direct action API 135 can generate at least one action data structure and can communicate with at least one content provider computing device 155 to obtain at least one digital component. The prediction component 120 can access the parameters 146 or policies 147 in the data repository 145 to determine or otherwise estimate requests for action data structures or digital components. For example, the parameters 146 or policies 147 could indicate requests for a beach weekend weather forecast action or for digital components related to beach visits, such as a digital component for sunscreen.

The content selector component 125 can obtain indications of any of the interest in or request for the action data structure or for the digital component. For example, the prediction component 120 can directly or indirectly (e.g., via the data repository 145) provide an indication of the action data structure or digital component to the content selector component 125. The content selector component 125 can obtain this information from the data repository 145, where it can be stored as part of the content data 148. The indication of the action data structure can inform the content selector component 125 of a need for area beach information, such as a weather forecast or products or services the end user may need for a trip to the beach.

From the information received by the content selector component 125, e.g., an indication of a forthcoming trip to the beach, the content selector component 125 can identify at least one digital component. The digital component can be responsive or related to the subject matter of the input audio query. For example, the digital component can include data message identifying a store near the beach that has sunscreen, or offering a taxi ride to the beach. The content selector component 125 can query the data repository 145 to select or otherwise identify the digital component, e.g., from the content data 148. The content selector component 125 can also select the digital component from the content provider computing device 155. For example responsive to a query received from the data processing system 105, the content provider computing device 155 can provide a digital component to the data processing system 105 (or component thereof) for eventual output by the client computing device 150 that originated the input audio signal, or for output to the same end user by a different client computing device 150.

The audio signal generator component 130 can generate or otherwise obtain an output signal that includes the digital component (as well as the action data structure) responsive to the input audio signal. For example, the data processing system 105 can execute the audio signal generator component 130 to generate or create an output signal corresponding to the action data structure or to the digital component. The interface 115 of the data processing system 105 can provide or transmit one or more data packets that include the output signal via the computer network 165 to any client computing device 150. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 105 can provide the output signal including the action data structure from the data repository 145 or from the audio signal generator component 130 to the client computing device 150. The data processing system 105 can provide the output signal including the digital component from the data repository 145 or from the audio signal generator component 130 to the same or to a different client computing device 150.

The data processing system 105 can also instruct, via data packet transmissions, the content provider computing device 155 or the service provider computing device 160 to provide the output signal (e.g., corresponding to the action data structure or to the digital component) to the client computing device 150. The output signal can be obtained, generated, transformed to or transmitted as one or more data packets (or other communications protocol) from the data processing system 105 (or other computing device) to the client computing device 150.

The content selector component 125 can select the digital component or the action data structure as part of a real-time content selection process. For example, the action data structure can be provided to the client computing device 150 for transmission as audio output by an interface of the client computing device 150 in a conversational manner in direct response to the input audio signal. The real-time content selection process to identify the action data structure and provide the digital component to the client computing device 150 can occur within one minute or less from the time of the input audio signal and be considered real-time. The data processing system 105 can also identify and provide the digital component to at least one interface of the client computing device 150 that originated the input audio signal, or to a different client computing device 150.

The action data structure (or the digital component), for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the action data structure or to the digital component. The acoustic wave can include words of or corresponding to the action data structure or digital component.

The acoustic wave representing the action data structure can be output from the client computing device 150 separately from the digital component. For example, the acoustic wave can include the audio output of "Today it will be sunny and 80 degrees at the beach." In this example, the data processing system 105 obtains the input audio signal of, for example, "OK, I would like to go to the beach this weekend." From this information the NLP component 110 identifies at least one request or at least one trigger keyword, and the prediction component 120 uses the requests or trigger keywords to identify a request for an action data structure or for a digital component. The content selector component 125 (or other component) can identify, select, or generate a digital component for, e.g., sunscreen available near the beach. The direct action API 135 (or other component) can identify, select, or generate an action data structure for, e.g., the weekend beach forecast. The data processing system 105 or component thereof such as the audio signal generator component 130 can provide the action data structure for output by an interface of the client computing device 150. For example, the acoustic wave corresponding to the action data structure can be output from the client computing device 150. The data processing system 105 can provide the digital component for output by a different interface of the same client computing device 150 or by an interface of a different client computing device 150.

The packet based data transmission of the action data structure by data processing system 105 to the client computing device 150 can include a direct or real-time response to the input audio signal of "OK, I would like to go to the beach this weekend" so that the packet based data transmissions via the computer network 165 that are part of a communication session between the data processing system 105 and the client computing device 150 with the flow and feel of a real-time person to person conversation. This packet based data transmission communication session can also include the content provider computing device 155 or the service provider computing device 160.

The content selector component 125 can select the digital component or action data structure based on at least one request or at least one trigger keyword of the input audio signal. For example, the requests of the input audio signal "OK, I would like to go to the beach this weekend" can indicate subject matter of the beach, travel to the beach, or items to facilitate a trip to the beach. The NLP component 110 or the prediction component 120 (or other data processing system 105 components executing as part of the direct action API 135) can identify the trigger keyword "go" "go to" or "to go to" and can determine a transportation request to the beach based at least in part on the trigger keyword. The NLP component 110 (or other system 100 component) can also determine a solicitation for digital components related to beach activity, such as for sunscreen or beach umbrellas. Thus, the data processing system 105 can infer actions from the input audio signal that are secondary requests (e.g., a request for sunscreen) that are not the primary request or subject of the input audio signal (information about the beach this weekend).

The action data structures and digital components can correspond to subject matter of the input audio signal. The direct action API 135 can execute programs or scripts, for example from the NLP component 110, the prediction component 120, or the content selector component 125 to identify action data structures or digital components for one or more of these actions. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The direct action API 135 of the data processing system 105 can generate, based on the request or the trigger keyword, the action data structures. The action data structures can be generated responsive to the subject matter of the input audio signal. The action data structures can be included in the messages that are transmitted to or received by the service provider computing device 160. Based on the input audio signal parsed by the NLP component 110, the direct action API 135 can determine to which, if any, of a plurality of service provider computing devices 160 the message should be sent. For example, if an input audio signal includes "OK, I would like to go to the beach this weekend," the NLP component 110 can parse the input audio signal to identify requests or trigger keywords such as the trigger keyword word "to go to" as an indication of a need for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location (e.g., home) and a destination location (e.g., a beach). The direct action API 135 can retrieve a template 149 from the data repository 145 to determine which fields to include in the action data structure. The direct action API 135 can retrieve content from the data repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

The content selector component 125 can identify, select, or obtain multiple digital components resulting from a multiple content selection processes. The content selection processes can be real-time, e.g., part of the same conversation, communication session, or series of communications sessions between the data processing system 105 and the client computing device 150 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 105 of an indication of a termination or expiration of the conversation. For example, the data processing system 105 can determine that a conversation related to a weekend beach trip begins at the time or receipt of the input audio signal and expires or terminates at the end of the weekend, e.g., Sunday night or Monday morning. The data processing system 105 that provides action data structures or digital components for rendering by one or more interfaces of the client computing device 150 or of another client computing device 150 during the active time period of the conversation (e.g., from receipt of the input audio signal until a determined expiration time) can be considered to be operating in real-time. In this example the content selection processes and rendering of the digital components and action data structures occurs in real time.

The data processing system 105 can include the interface management component to poll, determine, identify, or select interfaces for rendering of the action data structures and of the digital components related to the input audio signal. For example, the interface management component can identify one or more candidate interfaces of client computing devices 150 associated with an end user that entered the input audio signal (e.g., "What is the weather at the beach today?") into one of the client computing devices 150 via an audio interface. The interfaces can include hardware such as sensor 151 (e.g., a microphone), speaker 154, or a screen size of a computing device, alone or combined with scripts or programs (e.g., the audio driver 153) as well as apps, computer programs, online documents (e.g., webpage) interfaces and combinations thereof.

The interfaces can include social media accounts, text message applications, or email accounts associated with an end user of the client computing device 150 that originated the input audio signal. Interfaces can include the audio output of a smartphone, or an app based messaging device installed on the smartphone, or on a wearable computing device, among other client computing devices 150. The interfaces can also include display screen parameters (e.g., size, resolution), audio parameters, mobile device parameters, (e.g., processing power, battery life, existence of installed apps or programs, or sensor 151 or speaker 154 capabilities), content slots on online documents for text, image, or video renderings of digital components, chat applications, laptops parameters, smartwatch or other wearable device parameters (e.g., indications of their display or processing capabilities), or virtual reality headset parameters.

The interface management component can poll a plurality of interfaces to identify candidate interfaces. Candidate interfaces include interfaces having the capability to render a response to the input audio signal, (e.g., the action data structure as an audio output, or the digital component that can be output in various formats including non-audio formats). The interface management component can determine parameters or other capabilities of interfaces to determine that they are (or are not) candidate interfaces. For example, the interface management component can determine, based on parameters 146 of the digital component or of a first client computing device 150 (e.g., a smartwatch wearable device), that the smartwatch includes an available visual interface of sufficient size or resolution to render the digital component. The interface management component can also determine that the client computing device 150 that originated the input audio signal has a speaker 154 hardware and installed program e.g., an audio driver or other script to render the action data structure.

The interface management component (or other data processing system 105 component) can convert the digital component for delivery in a modality compatible with the candidate interface. For example, if the candidate interface is a display of a smartwatch, smartphone, or tablet computing device, the interface management component can size the digital component for appropriate visual display given the dimensions of the display screen associated with the interface. The interface management component can also convert the digital component to a packet or other protocol based format, including proprietary or industry standard format for transmission to the client computing device 150 associated with the selected interface. The interface selected by the interface management component for the digital component can include an interface accessible from multiple client computing devices 150 by the end user. For example, the interface can be or include a social media account that the end user can access via the client computing device 150 that originated the input audio signal (e.g., a smartphone) as well as other client computing devices such as tablet or desktop computers or other mobile computing devices.

The interface management component can also select at least one candidate interface for the action data structure. This interface can be the same interface from which the input audio signal was obtained, e.g., a voice activated assistant service executed at a client computing device 150. This can be the same interface or a different interface than the interface management component selects for the digital component. The interface management component (or other data processing system 105 components) can provide the action data structure to the same client computing device 150 that originated the input audio signal for rendering as audio output as part of the assistant service. The interface management component can also transmit or otherwise provide the digital component to the selected interface for the digital component, in any converted modality appropriate for rendering by the selected interface.

Thus, the interface management component can provide the action data structure as audio output for rendering by an interface of the client computing device 150 responsive to the input audio signal received by the same client computing device 150. The interface management component can also provide the digital component for rendering by a different interface of the same client computing device 150 or of a different client computing device 150 associated with the same end user. For example, the action data structure, e.g., "it will be sunny and 80 degrees at the beach on Saturday" can be provided for audio rendering by the client computing device as part of an assistant program interface executing in part at the client computing device 150, and the digital component e.g., a text, audio, or combination digital component indicating that "sunscreen is available from the convenience store near the beach" can be provided for rendering by an interface of the same or a different computing device 150, such as an email or text message accessible by the same or a different client computing device 150 associated with the end user.

Separating the digital component from the action data structure and sending the digital component as, for example, a text message rather than an audio message can result in reduced processing power for the client computing device 150 that accesses the digital component since, for example, text message data transmissions are less computationally intensive than audio message data transmissions. This separation can also reduce power usage, memory storage, or transmission bandwidth used to render the digital component. This results in increased processing, power, and bandwidth efficiencies of the system 100 and devices such as the client computing devices 150 and the data processing system 105. This increases the efficiency of the computing devices that process these transactions, and increases the speed with which the digital components can be rendered. The data processing system 105 can process thousands, tens of thousands or more input audio signals simultaneously so the bandwidth, power, and processing savings can be significant and not merely incremental or incidental.

The interface management component can provide or deliver the digital component to the same client computing device 150 (or a different device) as the action data structure subsequent to delivery of the action data structure to the client computing device 150. For example, the digital component can be provided for rendering via the selected interface upon conclusion of audio output rendering of the action data structure. The interface management component can also provide the digital component to the selected interface concurrent with the provision of the action data structure to the client computing device 150. The interface management component can provide the digital component for delivery via the selected interface within a pre-determined time period from receipt of the input audio signal by the NLP component 110. The time period, for example, can be any time during an active length of the conversation of session. For example, if the input audio signal is "I would like to go to the beach this weekend" the pre-determined time period can be any time from receipt of the input audio signal through the end of the weekend, e.g., the active period of the conversation. The pre-determined time period can also be a time triggered from rendering of the action data structure as audio output by the client computing device 150, such as within 5 minutes, one hour or one day of this rendering.

The interface management component can provide the action data structure to the client computing device 150 with an indication of the existence of the digital component. For example, the data processing system 105 can provide the action data structure that renders at the client computing device 150 to provide the audio output "it will be sunny and 80 degrees at the beach on Saturday, check your email for more information." The phrase "check your email for more information" can indicate the existence of a digital component, e.g., for sunscreen, provided by the data processing system 105 to an interface (e.g., email). In this example, sponsored content can be provided as digital components to the email (or other) interface and organic content such as the weather can be provided as the action data structure for audio output.

The data processing system 105 can include the source allocation component 140. The source allocation component 140 can determine which elements of the system 100 include instances (or associated instances) of a digital component. For example, once the content selector component 125 selects a digital component, the source allocation component 140 can determine which of the content provider device 155, the service provider device 160, and the client computing device 150 have an instance of the digital component. The client computing device 150, the service provider devices 160, and the content provider devices 155 that have an instance of the digital component can be referred to as candidate content sources. The interfaces identified by the interface management component can be the interfaces of the candidate content sources. In some implementations, the source allocation component 140 can store, in the data repository 145, an index of the digital components stored or offered by each of the candidate content sources. In some implementations, the source allocation component 140 can poll each of (or a sub-population of) the content provider devices 155 and service provider devices 160 to determine if the content provider devices 155 or the service provider devices 160 include an instance of the digital component. For example, the source allocation component 140 can send a request to a content provider device 155 for the digital component. If the content provider device 155 responds affirmatively, the source allocation component 140 can flag the content provider device 155 as a candidate content source. In some implementations, the content provider device's (or other potential candidate content source's) response can include data and other information about the potential candidate content source and its instance of the digital component that the source allocation component 140 can use to generate a characteristic for the potential candidate content source and for the instance of the digital component stored on each of the potential candidate content sources.

The source allocation component 140 can determine or calculate characteristics for each of the instances of the digital component. The characteristics can indicate the quality (or a quality metric) of the instance of the digital component. The source allocation component 140 can also calculate a characteristic (or quality metrics) for each of the candidate content sources. In some implementations, the source allocation component 140 can determine a characteristic for each of the instances of the digital component identified in the system 100. For example, a candidate content source can include multiple instances of the digital component (e.g., a high-resolution and a low-resolution of the digital component). The source allocation component 140 can determine a separate characteristic for each of the instances of the candidate content source's digital component.

The source allocation component 140 can use the characteristics to indicate or determine if the candidate content source can provide to or the client computing device 150 can render the digital component. The characteristics for the digital component and candidate content sources can include parameters 146 obtained from the data repository 145 or other parameters obtained from the client computing device 150, such as bandwidth or processing utilization or requirements, processing power, power requirements, battery status, memory utilization or capabilities, or other interface parameters that indicate the available of an interface to render action data structures or digital components. The battery status can indicate a type of power source (e.g., internal battery or external power source such as via an output), a charging status (e.g., currently charging or not), or an amount of remaining battery power.

The source allocation component 140 can use characteristics for the candidate content sources, qualities of their respective connection to the data processing system 105 or the client computing device 150, and the characteristics of the respective instances of the digital component. For example, the characteristics can be based on the bandwidth of the connections, the utilization of the connections, the utilization of the candidate content sources, whether the instance is a free or paid-for instance of the digital component, quality of the digital component, file size of the digital component, encoding scheme of the digital component, file format of the digital component, distances between the client computing device 150 and the storage location of the instance of the digital component, location of the client computing device 150, location of the digital component, or any combination thereof. For example, the source allocation component 140 can determine that the digital component is stored or available on a candidate content source that is a personal computer local (e.g., on the same Wi-Fi network) to the client computing device 150, which the client computing device 150 has access to. In this example, the location characteristic can indicate that the candidate content source is available to provide the digital component. In another example, the client computing device 150 may not be on the same Wi-Fi network as the candidate content source that is the personal computer. In this example, the location characteristic can indicate that the candidate content source is not available to provide the digital component.

The source allocation component 140 can order or rank the candidate content sources (or their respective instances of the digital component) in a hierarchy or ranking based on the characteristics. For example, different parameters (e.g., processing requirements, display screen size, accessibility to the end user, and file quality) can be given different weights. The source allocation component 140 can rank one or more of the characteristics of the candidate interfaces based on their weights to determine an optimal corresponding candidate content source for providing the digital component. For example, based on this hierarchy, the source allocation component 140 can select the highest ranked candidate content source for providing the digital component to the client computing device 150.

In some implementations, the candidate content source with the highest ranked characteristic can indicate that providing the digital component from that candidate content source would consume the least amount of computational or network resources. For example, the use of a local instance of the digital component, already stored on the client computing device 150, can consume fewer resources when compared to a remotely stored instance of the digital component. In some implementations, the instance of the digital component with the highest characteristic can indicate that the delivery of the digital component from that candidate content source will provide a relatively higher user experience. For example, the client computing device 150 may include a low-quality version of the digital component that was downloaded to the client computing device 150 when the client computing device 150 was connected to the network 165 via a cellular connection. The source allocation component 140 may assign a relatively higher characteristic to an instance of the digital component that is remote to the client computing device 150 but is a high-quality version of the digital component. In some implementations, a relatively high characteristic for an instance of the digital component can over-ride a relatively low characteristic for the candidate content source. In other implementations, a relatively high characteristic for a candidate content source can over-ride a relatively low characteristic for the instance of the digital component. For example, the data processing system 105 can determine to send a low-resolution video to a client computing device 150 when the client computing device 150 has a low bandwidth connection to the data processing system 105.

The data processing system 105 can also provide the action data structure with a prompt that queries the user to determine user interest in obtaining the digital component. For example, the action data structure can indicate "it will be sunny and 80 degrees at the beach on Saturday, would you like to hear about some services to assist with your trip?" The data processing system 105 can receive another input audio signal from the client computing device 150 in response to the prompt "would you like to hear about some services to assist with your trip?" such as "sure". The NLP component 110 can parse this response, e.g., "sure" and interpret it as authorization for audio rendering of the digital component by the client computing device 150. In response, the data processing system 105 can provide the digital component for audio rendering by the same client computing device 150 from which the response "sure" originated.

The data processing system 105 can delay transmission of the digital component associated with the action data structure to optimize processing utilization. For example, the data processing system 105 provide the action data structure for rendering as audio output by the client computing device in real-time responsive to receipt of the input audio signal, e.g., in a conversational manner, and can delay digital component transmission until an off-peak or non-peak period of data center usage, which results in more efficient utilization of the data center by reducing peak bandwidth usage, heat output or cooling requirements. The data processing system 105 can also initiate a conversion or other activity associated with the digital component, such as ordering a car service responsive to a response to the action data structure or to the digital component, based on data center utilization rates or bandwidth metrics or requirements of the network 165 or of a data center that includes the data processing system 105.

Based on a response to a digital component or to the action data structure for a subsequent action, such as a click on the digital component rendered via the selected interface, the data processing system 105 can identify a conversion, or initiate a conversion or action. Processors of the data processing system 105 can invoke the direct action API 135 to execute scripts that facilitate the conversion action, such as to order a car from a car share service to take the end user to or from the beach. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation.

Figure 2:
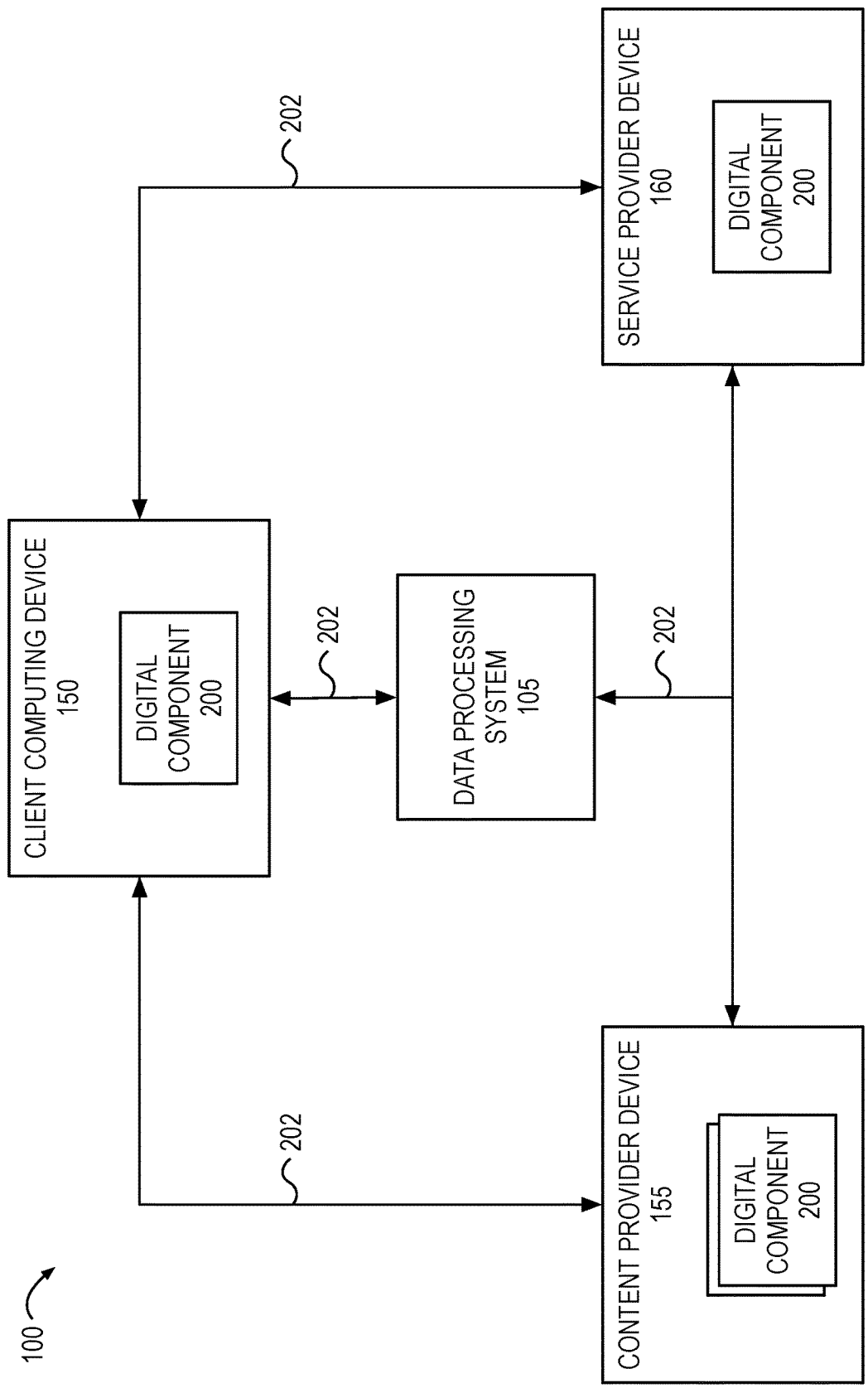
FIG. 2 illustrates a block diagram of the selection of a digital component in the system illustrated in FIG. 1.

FIG. 2 illustrates a block diagram of the selection of a digital component in the system illustrated in FIG. 1. The system 100 includes a content provider device 155 and a service provider device 160. The client computing device 150, the content provider device 155, and the service provider device 160 can each include one or more instances of the digital component 200. Each of the components of the system 100 identified by the data processing system 105 as storing an instance of the digital component 200 can be referred to as candidate content sources. The data processing system 105, the client computing device 150, the content provider device 155, and the service provider device 160 are each connected to via connections 202. The connections 202 can be made through the network 165. The client computing device 150 can have a connection 202 to the data processing system 105, content provider device 155, the service provider device 160, or any combination thereof. In some implementations, the client computing device 150 can only have a connection with the data processing system 105, via, for example, the network 165.

Figure 3:
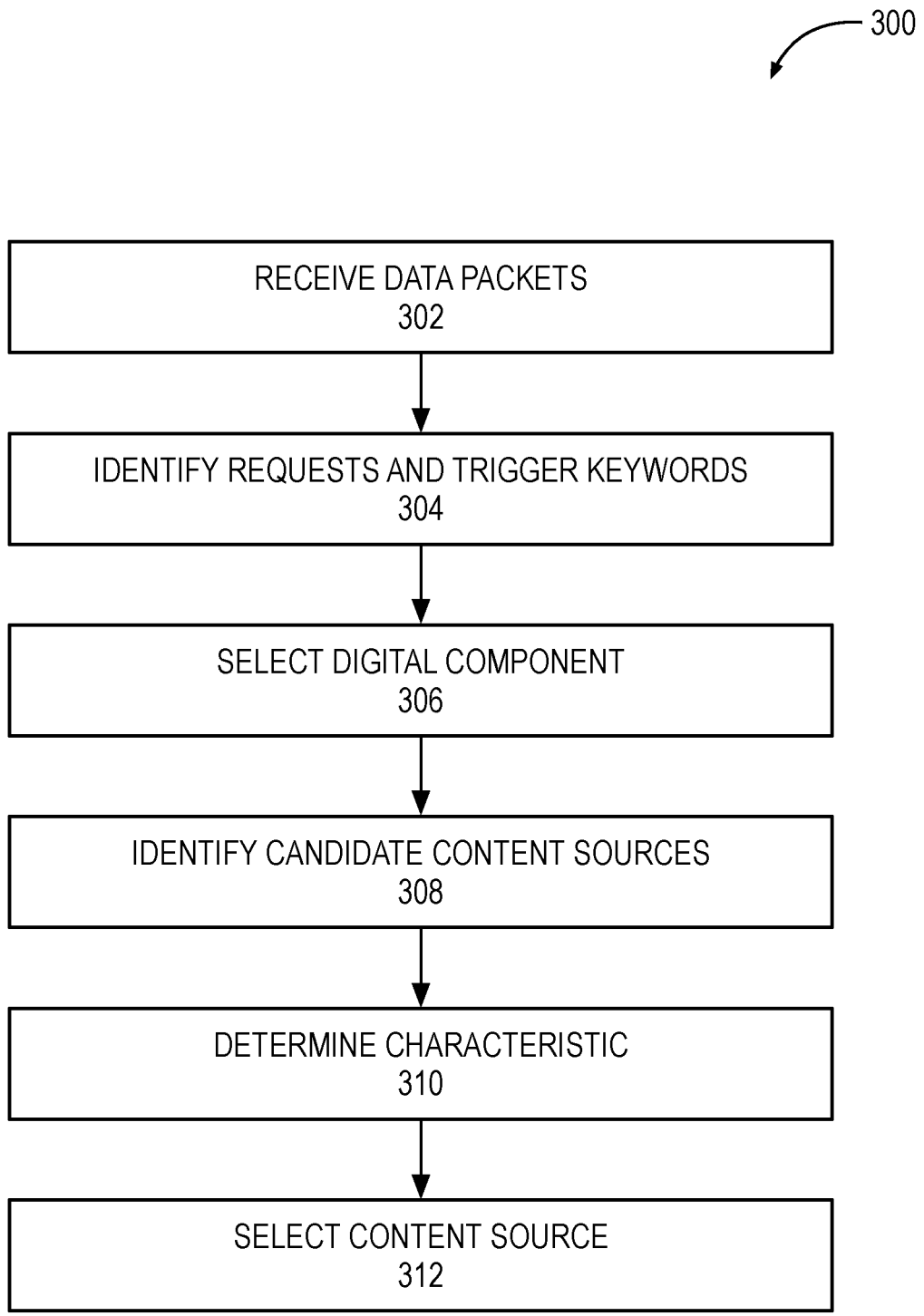
FIG. 3 illustrates a block diagram of an example method to allocate content sources in a voice activated packet-based computer network environment.

As described further in relation to FIG. 3, among others, the client computing device 150 can transmit an input audio signal to the data processing system 105. The data processing system 105 can execute the NLP component 110, which can identify a request and one or more trigger keywords in the input audio signal. The data processing system 105 can select a digital component 200 based on the request and one or more trigger keywords. For example, the request can be to play a specific song on the client computing device 150, which may be a speaker-based assistant device. Instances of the digital component 200, identified by the data processing system 105, can be stored on the client computing device 150, the content provider device 155, the service provider device 160, or any combination thereof. The data processing system 105 can determine which instance of the digital component 200 should be provided to the client computing device 150 by calculating a characteristic of each of the candidate content sources, the connections 202 thereto, and the instances of the digital component. The characteristic for a given candidate content source or instance of the digital component can be based on characteristics of the candidate content source itself and the digital component 200 stored therein. For example, the characteristics can include the quality of the instance of the digital component 200, the availability of the digital component 200, or the utilization of the content provider device 155. The characteristic can also be based on the utilization, status, or other characteristics of the client computing device 150. The utilization or characteristics can include the type of connection to the network 165, the battery status, power status, processor capabilities, display capabilities, or memory status of the client computing device 150.

As illustrated for example by the content provider device 155 in FIG. 2, a candidate content source can include multiple instances of the digital component 200. When a candidate content source contains more than one instance of the digital component 200, the source allocation component 140 can calculate or otherwise determine a characteristic to be associated with each of the instances of the digital component 200 on the candidate content source and each of the respective candidate content sources. The different instances of the digital component 200 can have different characteristics or can be duplicates of the same digital component 200. The characteristics can include file quality, file formats, encoding types, file size, or permission requirements. For example, if the digital component 200 is a video file, a first instance of the digital component 200 on a candidate content source can be a high-definition version of the video file and a second instance of the digital component 200 can be a standard-definition version of the video file.

Each of the multiple instances of a digital component 200 on a given candidate content source can correspond to a different user or account. For example, the content provider device 155 can be an email provider. The first instance of the digital component 200 can correspond to the email account of a first user and the second instance of the digital component 200 can correspond to the email account of a second user. For example, a first user of the client computing device 150 can provide the input audio signal, "Ok, read me my last email." The client computing device 150 or data processing system 105 can determine which user of the client computing device 150 provided the input audio signal. The data processing system 105 can then assign the digital component 200 (e.g., email account) on the candidate content source associated a second user of the client computing device 150 with a low or null characteristic such that that email account is not selected.

The client computing device 150 can already include an instance of the digital component 200, as illustrated in FIG. 2. The data processing system 105 can determine the client computing device 150 includes an instance of the digital component 200 and the data processing system 105 can label the client computing device 150 as a candidate content source. The data processing system 105 can still determine that the content provider device 155 and the service provider device 160 are candidate content sources and can assign at least one characteristic to the client computing device 150, the content provider device 155, and the service provider device 160. In some implementations, the data processing system 105 can determine the client computing device 150 has a relatively high characteristic because substantially no network resources would be used in rendering or providing the digital component 200 on the client computing device 150. However, one of the candidate content sources could have a high-quality version of the digital component 200 (or other characteristic) that causes the data processing system 105 to assign the remote candidate content source a relatively higher characteristic when compared to the client computing device 150. In this example, the data processing system 105 could transmit (or have the candidate content source transmit) the digital component 200 to the client computing device 150 even through the client computing device 150 already possessed an instance of the digital component 200.

As the source allocation component 140 selects content sources from the candidate content sources, the source allocation component 140 can generate a dynamic index of the content stored on each of the candidate content sources or a dynamic index of which candidate content source is selected. The index can be valid for a predetermined amount of time. If the source allocation component 140 determines the index is still valid when a subsequent request for a digital component is received, the source allocation component 140 can use the index to select a content source without first finding a plurality of candidate content sources and calculating characteristics for each of the candidate content sources.

FIG. 3 illustrates a block diagram of an example method 300 to allocate content sources in a voice activated packet-based computer network environment. The method 300 can include receiving data packets (ACT 302). The method 300 can include identifying requests and trigger keywords (ACT 304). The method 300 can include selecting a digital component (ACT 306). The method 300 can include identifying candidate content sources (ACT 308). The method 300 can include determining characteristics (ACT 310). The method 300 can include selecting a content source (ACT 312).

As set forth above, the method 300 can include receiving data packets (ACT 302). The data packets can include an input audio signal. The input audio signal can be detected by a sensor of a client computing device and transmitted by the client computing device to the data processing system 105. The NLP component 110, executed by the data processing system 105, can receive from the client computing device 150 the data packets. The data packets can be received via the network 165 as packet or other protocol based data transmissions.

The method 300 can include identifying requests and trigger keywords (ACT 304). The NLP component 110 can identify the request and the trigger keywords in the input audio signal that the data processing system 105 received as data packets. For example, the NLP component 110 can parse the input audio signal to identify requests that relate to subject matter of the input audio signal. The NLP component 110 can parse the input audio signal to identify trigger keywords that can indicate, for example, actions associated with the requests.

The method 300 can include selecting at least one digital component (ACT 306). The content selector component 125 can receive the requests or the trigger keywords and based on this information can select one or more digital components. For example, the input audio signal can be "Ok, play Neil Young" and the NLP component 110 can determine the request is for a music song performed by Neil Young. In this example, the content selector component 125 can select a digital component that includes a song performed by Neil Young, a Neil Young streaming radio station, or a song in a style similar to that of Neil Young. The data processing system 105 can also generate at least one action data structure.

The method 300 can include identifying content sources (ACT 308). The source allocation component 140 can identify a plurality of candidate content sources subsequent to identifying the digital component. Each of the plurality of candidate content sources can include (e.g., store an instance of) the digital component or a related digital component. Continuing the above example, each of the candidate content sources can be a different online music streaming service that include the Neil Young song selected during ACT 306.

The method 300 can include determining one or more characteristics (ACT 310). The source allocation component 140 can determine a characteristic for each of the plurality of candidate content sources and a characteristic for each instance of the digital component they contain. The characteristic can be based on a connection between the respective candidate content source and the client computing device. For example, the source allocation component 140 can consider the bandwidth of the connection and the quality of the connection. The source allocation component 140 can also incorporate the type and quality of the connection the client computing device has with the network. For example, whether the client computing device is connected to the network via WiFi or via a cellular connection. In some implementations, the characteristic for each of the respective candidate content source can be based on the file quality of the instance of the digital component the respective candidate content source has. For example, the quality of the instance can include the bit rate, file size, encoding codec, and file format.

The characteristic can be based on a purchase status or availability of the digital component. For example, the user may have purchased an instance of the digital component from a first candidate content source. The first candidate content source can be given a higher characteristic as compared to a second candidate content source from which the user has not purchased the digital component. The characteristic can be based on the location of the candidate content source and its respective instance of the digital component. The location can be the physical location of the digital component. For example, an instance of the digital component stored local to the client computing device can be given a higher quality score compared to a remote instance of the digital component. Similarly, a candidate content source storing an instance of the digital component within the same geographical region as the client computing device (e.g., the same state or country) can be given a higher characteristic as compared to a candidate content source storing its instance of the digital component in a different geographical region.

The characteristic for each of the respective candidate content sources can be based on the utilization (or status) of the client computing devices. The utilization of the client computing device can be based on the processor capability, memory capability or availability, battery status, available power, network bandwidth utilization, or interface parameters. By basing the characteristic on the client computing device's utilization, the data processing system 105 can reduce network bandwidth usage, latency, or processing utilization or power consumption of the client computing device that renders the digital component. This saves processing power and other computing resources such as memory, reduces electrical power consumption by the data processing system and the reduced data transmissions via the computer network reduces bandwidth requirements and usage of the data processing system. For example, the candidate content sources containing instances of the digital component that the client computing device cannot properly render can be given a relatively lower characteristic. In some implementations, the characteristic is based only on the utilization or status of the client computing device.

The source allocation component 140 can select a first plurality of candidate content sources. The source allocation component 140 can determine a characteristic for each of the first plurality of candidate content sources. The source allocation component 140 can compare the characteristics to a threshold. If the characteristics of the first plurality of candidate content sources do not cross the threshold, the source allocation component 140 can select a second plurality of candidate content sources. The source allocation component 140 can calculate and compare the characteristics of the second plurality of candidate content sources to the threshold. The source allocation component 140 can repeat this process until one or more candidate content sources are found to have a characteristic above the threshold. Each of the plurality of candidate content sources can include a single candidate content source. For example, the source allocation component 140 can start with the candidate content source that would consume the least amount of computational and network resources in delivering the digital component to the client computing device (but may have a relatively lower characteristic). If the first candidate content source is determined to have a characteristic above the quality threshold, the source allocation component 140 can select the first candidate content source as the content source to provide the digital component to the client computing device. If the first candidate content source's characteristic is below the quality threshold, the source allocation component 140 can continue to select and test candidate content sources until the source allocation component 140 locates a candidate content source with a characteristic above the quality threshold.

The method 300 can include selecting a content source from the plurality of candidate content sources (ACT 312). The source allocation component 140 can select a content source from the plurality of candidate content sources based on a ranking of the characteristics for each of the plurality of candidate content sources. The ranking can identify which of the candidate content source has the highest quality instance of the digital component, the best connection to the data processing system 105 or the client computing device, or would consume the least amount of network or computational resources in transmitting the digital component to the client computing device.

The data processing system 105 can request a copy of the digital component from the selected candidate content source and then provide the digital component to the client computing device. In other implementations, the data processing system 105 can initiate a session between the selected candidate content source and the client computing device. The selected candidate content source can stream, transmit, or otherwise provide the digital component to the client computing device without first providing the digital component to the data processing system 105. In some implementations, the data processing system 105 can store a reference to the selected candidate content source in association with a reference to the client computing device for a predetermined length of time. If the client computing device requests a subsequent digital component within the predetermined length of time, the data processing system 105 can request the digital component from the previously selected candidate content source without first determining and ranking a plurality of candidate content sources. In other implementations, the data processing system 105 can perform the method 300 each time that the client computing device requests a digital component.

Each aspect of the disclosure may include one or more of the following features. The source allocation component can: receive the digital component from the content source; and transmit the digital component to the client computing device. The source allocation component can: detect a second instance of the digital component on one of the plurality of candidate content sources; and determine a second characteristic for the second instance of the digital component on one of the plurality of content sources. The source allocation component may: determine a utilization rate of the client computing device; and select the content source based on the utilization rate of the client computing device. The utilization rate may be based on at least one of a battery level of the client computing device, a storage availability of the client computing device, or a processor availability of the client computing device. The content selector component may: select the content source from the plurality of candidate content sources based on the characteristic of the content source being higher than the characteristic of the respective instances of the digital component on the content source. The content selector component may: select the content source from the plurality of candidate content sources based on the characteristic of the content source being lower than the characteristic of the respective instances of the digital component on the content source. The request may be a request to initiate a session between the client computing device and the content source. The content selector component may select a second digital component. The source allocation component may: identify a second plurality of candidate content sources, each of the second plurality of candidate content sources comprising a respective instance of the second digital component; determine a characteristic for each of the second plurality of candidate content sources; determine the characteristic for each of the second plurality of candidate content sources is below a predetermined threshold; and identify a third plurality of candidate content sources, each of the third plurality of candidate content sources comprising a respective instance of the second digital component. The content selector component may select a second digital component; and request the second digital component from the content source based on determining the content source is valid. The natural language processor component may determine an account associated with the input audio signal; the source allocation component to determine the characteristic for each of the respective instances of the digital component. The characteristic for a respective one of the plurality of candidate content sources may be based on at least one of a connection quality or a bandwidth availability between the data processing system and the respective one of the plurality of candidate content sources. The characteristic for a respective one of the plurality of candidate content sources may be based on a connection quality or a bandwidth availability between the client computing device and the respective one of the plurality of candidate content sources. The characteristic for a respective one of the plurality of candidate content sources may be based on a quality characteristic or a storage location of the respective instance of the digital component stored at the respective one of the plurality of candidate content sources. Transmitting, by the source allocation component, the instance of the digital component to the client computing device. Detecting, by the source allocation component, a second instance of the digital component on one of the plurality of candidate content sources; and determining, by the source allocation component, a second characteristic for the second instance of the digital component on one of the plurality of content sources. Selecting, by the content selector component, a second digital component; identifying, by the source allocation component, a second plurality of candidate content sources, each of the second plurality of candidate content sources comprising a respective instance of the second digital component; determining, by the source allocation component, a characteristic for each of the second plurality of candidate content sources; determining, by the source allocation component, the characteristic for each of the second plurality of candidate content sources is below a predetermined threshold; and identifying, by the source allocation component, a third plurality of candidate content sources, each of the third plurality of candidate content sources comprising a respective instance of the second digital component. Determining, by the natural language processor component, an account associated with the input audio signal; determining, by the source allocation component, the characteristic for each of the respective instances of the digital component.

Figure 4:
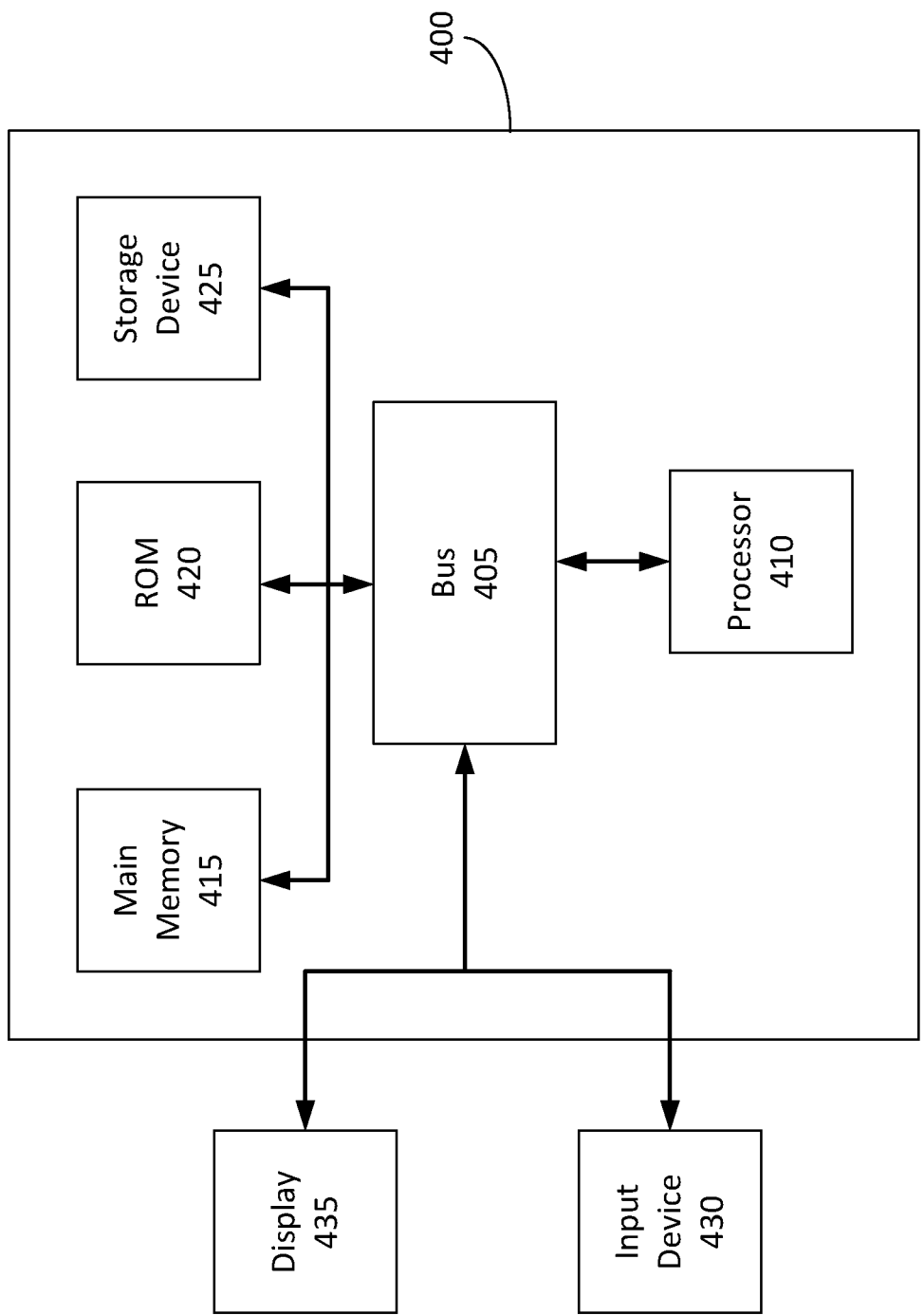
FIG. 4 is a block diagram illustrating a general architecture for a computer system that may be employed to implement elements of the systems and methods described and illustrated herein.

FIG. 4 is a block diagram of an example computer system 400. The computer system or computing system 400 can include or be used to implement the system 100, or its components such as the data processing system 105. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 105, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interface management component, direct action API 135, content selector component 125, prediction component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing action data structures or digital components) to a client computing device (e.g., to the client computing device 150 for purposes of displaying data to and receiving user input from a user interacting with the client computing device, or to the service provider computing device 160 or the content provider computing device 155). Data generated at the client computing device (e.g., a result of the user interaction) can be received from the client computing device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, the interface management component, or the prediction component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to allocate content sources in a voice activated packet-based computer network environment, comprising:

a natural language processor component executed by a data processing system, to receive, at an interface of the data processing system, data packets comprising an input audio signal detected by a sensor of a client computing device;

the natural language processor component to parse the input audio signal to identify a request and a trigger keyword corresponding to the request;

a content selector component to select a digital component based on at least one of the request and the trigger keyword;

a source allocation component to identify, subsequent to the selection of the digital component, a plurality of candidate content sources, each of the plurality of candidate content sources comprising a respective instance of the digital component;

the source allocation component to determine a characteristic for each of the plurality of candidate content sources and a characteristic of each of the respective instances of the digital component;

the source allocation component to determine a utilization rate of the client computing device;

the source allocation component to select a content source from the plurality of candidate content sources based on the characteristic for each of the plurality of candidate content sources, the characteristic of each of the respective instances of the digital component, and the utilization rate of the client computing device; and the source allocation component to generate a request for the digital component from the content source.

2. The system of claim 1, comprising the source allocation component to:

receive the digital component from the content source; and transmit the digital component to the client computing device.

3. The system of claim 1, comprising the source allocation component to:

detect a second instance of the digital component on one of the plurality of candidate content sources; and determine a second characteristic for the second instance of the digital component on one of the plurality of content sources.

4. The system of claim 3, wherein a first instance of the digital component is an email account of a first user, and wherein the second instance of the digital component is an email account of a second user, the system further comprising:

the natural language processor component to determine that the input audio signal is received from the first user; and wherein the digital component transmitted, by the source allocation component, to the client computing device is data associated with the email account of the first user.

5. The system of claim 1, wherein the utilization rate is based on a battery level of the client computing device, a storage availability of the client computing device, and a processor availability of the client computing device.

6. The system of claim 1, comprising the content selector component to:

select the content source from the plurality of candidate content sources based on the characteristic of the content source being higher or lower than the characteristic of the respective instances of the digital component on the content source.

7. The system of claim 1, wherein the digital component is an audio song of a singer, and the plurality of candidate content sources are different online music streaming services.

8. The system of claim 1, wherein the request is a request to initiate a session between the client computing device and the content source.

9. The system of claim 1, comprising:

the content selector component to select a second digital component; and the source allocation component to:

identify a second plurality of candidate content sources, each of the second plurality of candidate content sources comprising a respective instance of the second digital component;

determine a characteristic for each of the second plurality of candidate content sources;

determine the characteristic for each of the second plurality of candidate content sources is below a predetermined threshold; and identify a third plurality of candidate content sources, each of the third plurality of candidate content sources comprising a respective instance of the second digital component.

10. The system of claim 1, comprising:

the content selector component to select a second digital component; and request the second digital component from the content source based on determining the content source is valid.

11. The system of claim 1, comprising:

the natural language processor component to determine an account associated with the input audio signal;

the source allocation component to determine the characteristic for each of the respective instances of the digital component.

12. The system of claim 1, wherein the characteristic for a respective one of the plurality of candidate content sources is based on a connection quality and a bandwidth availability between the data processing system and the respective one of the plurality of candidate content sources.

13. The system of claim 1, wherein the characteristic for a respective one of the plurality of candidate content sources is based on a connection quality or a bandwidth availability between the client computing device and the respective one of the plurality of candidate content sources.

14. The system of claim 1, wherein the characteristic for a respective one of the plurality of candidate content sources is based on a storage location of the respective instance of the digital component stored at the respective one of the plurality of candidate content sources.

15. A method to allocate content sources in a voice activated packet-based computer network environment, comprising:

receiving, by a natural language processor component executed by a data processing system and at an interface of a data processing system, data packets comprising an input audio signal detected by a sensor of a client computing device;

parsing, by the natural language processor component, the input audio signal to identify a request and a trigger keyword corresponding to the request;

selecting, by a content selector component, a digital component based on at least one of the request and the trigger keyword;

identifying, by a source allocation component subsequent to selecting the digital component, a plurality of candidate content sources, each of the plurality of candidate content sources comprising a respective instance of the digital component;

determining, by the source allocation component, a characteristic for each of the plurality of candidate content sources and a characteristic of each of the respective instances of the digital component;

determining, by the source allocation component, a utilization rate of the client computing device;

selecting, by the source allocation component, a content source from the plurality of candidate content sources based on the utilization rate of the client computing device, a ranking of the characteristic for each of the plurality of candidate content sources, and the characteristic of each of the respective instances of the digital component; and requesting, by the source allocation component, an instance of the digital component from the content source.

16. The method of claim 15, comprising:

transmitting, by the source allocation component, the instance of the digital component to the client computing device.

17. The method of claim 15, comprising:

detecting, by the source allocation component, a second instance of the digital component on one of the plurality of candidate content sources; and determining, by the source allocation component, a second characteristic for the second instance of the digital component on one of the plurality of content sources.

18. The method of claim 15, wherein the characteristic for a respective one of the plurality of candidate content sources is based on at least one of a connection quality or a bandwidth availability between the data processing system and the respective one of the plurality of candidate content sources.

19. The method of claim 15, comprising:

selecting, by the content selector component, a second digital component;

identifying, by the source allocation component, a second plurality of candidate content sources, each of the second plurality of candidate content sources comprising a respective instance of the second digital component;

determining, by the source allocation component, a characteristic for each of the second plurality of candidate content sources;

determining, by the source allocation component, the characteristic for each of the second plurality of candidate content sources is below a predetermined threshold; and identifying, by the source allocation component, a third plurality of candidate content sources, each of the third plurality of candidate content sources comprising a respective instance of the second digital component.

20. The method of claim 15, comprising:

determining, by the natural language processor component, an account associated with the input audio signal; and determining, by the source allocation component, the characteristic for each of the respective instances of the digital component.

* * * * *